US012775491B2

(12) United States Patent
Wang et al.

(10) Patent No.: US 12,775,491 B2
(45) Date of Patent: Oct. 27, 2026

(54) METHOD FOR DETERMINING RESOURCE DISTRIBUTION CONSTRAINTS IN SPARSE DATA ENVIRONMENTS

(71) Applicant: Google LLC, Mountain View, CA (US)

(72) Inventors: Joshua Ruizhi Wang, Mountain View, CA (US); Brian Mulford, Rolling Hills Estates, CA (US); Qiaoran Li, San Jose, CA (US); Michael John de Ridder, Sunnyvale, CA (US); Pawel Opalinski, Henderson, NE (US); Tresa Johnson, San Jose, CA (US); Paul David Duetting, Bern (CH); Guru Guruganesh, Mountain View, CA (US); Jonathan Schneider, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 608 days.

(21) Appl. No.: 18/354,897

(22) Filed: Jul. 19, 2023

(65) Prior Publication Data

US 2025/0028556 A1 Jan. 23, 2025

(51) Int. Cl.
*G06F 9/50* (2006.01)

(52) U.S. Cl.
CPC .................................... *G06F 9/50* (2013.01)

(58) Field of Classification Search
CPC ........................................................ G06F 9/50
See application file for complete search history.

(56) References Cited

U.S. PATENT DOCUMENTS

| | | | |
|---|---|---|---|
| 11,902,177 B1 * | 2/2024 | Chakravarty | H04L 43/16 |
| 2009/0216619 A1 | 8/2009 | Tavernier | |
| 2014/0058849 A1 | 2/2014 | Saifee et al. | |
| 2014/0258000 A1 | 9/2014 | Connolly et al. | |
| 2015/0154631 A1 | 6/2015 | Umeda | |
| 2016/0371745 A1 | 12/2016 | Lidow et al. | |
| 2016/0378519 A1 * | 12/2016 | Gaurav | G06F 9/5077 718/1 |
| 2022/0107965 A1 * | 4/2022 | Hamdi | G06F 16/285 |
| 2023/0047295 A1 * | 2/2023 | Martinez | G06F 11/3409 |
| 2023/0315537 A1 * | 10/2023 | Samareh Abolhasani | G06F 11/3438 718/104 |

OTHER PUBLICATIONS

Dutting et al., "Simple versus Optimal Contracts" Submitted on Aug. 2020, arXiv:1808.03713v3, 31 pages.

(Continued)

*Primary Examiner* — Michael W Ayers
(74) *Attorney, Agent, or Firm* — Fish & Richardson P.C.

(57) ABSTRACT

Methods, systems, and apparatus, including computer programs encoded on a computer storage medium, for distributing resources to client devices are described. A computer-implemented system receives a request for a resource distribution constraint for a given resource of a first type, determines that a second type of resource that has a sufficient amount of historical distribution data to generate a distribution constraint, and determines the resource distribution constraint using historical distribution data for the second type of resource.

20 Claims, 4 Drawing Sheets

(56) References Cited

OTHER PUBLICATIONS

Rustichini et al., “Convergence to Efficiency in a Simple Market With Incomplete Information.” Discussion Paper No. 995, Aug. 1992, 44 pages.
Static.googleusercontent.com [online], “Maximizing advertising revenues for online publishers” Nov. 2013, retrieved on Jul. 13, 2023, retrieved from URL <https://static.googleusercontent.com/media/www.google.com/en//googleblogs/pdfs/revenue_maximization_090210.pdf>, 2 pages.
Wikipedia.org [online], “Contract Theory” created on Aug. 2003, retrieved on Jul. 13, 2023, retrieved from URL <https://en.wikipedia.org/wiki/Contract_theory>, 8 pages.
Wikipedia.org [online], “Myerson-Satterthwaite theorem” created on May 2006, retrieved on Jul. 13, 2023, retrieved from URL <https://en.wikipedia.org/wiki/Myerson%E2%80%93Satterthwaite_theorem>, 4 pages.
Wikipedia.org [online], “Principal-agent problem” created on Jun. 2004, retrieved on Jul. 13, 2023, retrieved from URL <https://en.wikipedia.org/wiki/Principal%E2%80%93agent_problem>, 20 pages.
Zhu et al., “The Sample Complexity of Online Contract Design” Submitted on May 2023, arXiv:2211.05732v3, 30 pages.

* cited by examiner

METHOD FOR DETERMINING RESOURCE DISTRIBUTION CONSTRAINTS IN SPARSE DATA ENVIRONMENTS

TECHNICAL FIELD

This specification generally relates to data processing for distributing a resource to client devices.

BACKGROUND

Many applications involve distributing resources to client devices. The distribution of a resource is often conditioned on constraints, such as conditions that need to be met or criteria that need to be satisfied for distributing the resource.

SUMMARY

This specification describes methods, computer systems, and apparatus, including computer programs encoded on computer storage media, for determining a resource distribution constraint and distributing resources based on the resource distribution constraints.

In one aspect, this specification describes a method for resource distribution. The method can be implemented by a system including one or more computers. The system receives a request for a resource distribution constraint that conditions distribution of a given resource of a first type having a first subset of feature categories among a set of feature categories; The system determines that there is not a sufficient amount of historical distribution data for resources of the first type having the first subset of feature categories to generate the requested distribution constraint. The system determines that a second type of resource (i) shares a first feature category among the first subset of feature categories with the given resource, (ii) has a second feature category that is not among the first subset of feature categories, and (iii) has a sufficient amount of historical distribution data to generate an distribution constraint for the second type of resource. The system determines a baseline resource distribution constraint using the historical distribution data for the second type of resource based on the second type of resource sharing the first feature category with the given resource. The system adjusts the baseline resource distribution constraint based at least on (i) one or more differences between the second type of resource and the first type of resource, and (ii) predicted scope of distribution of the given resource to an adjusted resource distribution constraint. The system distributes the given resource to multiple different client devices according to the adjusted resource distribution constraint.

In some implementations, the adjusted resource distribution constraint specifies a guaranteed minimum output to a provider of the given resource irrespective of an actual scope of distribution of the given resource.

In some implementations, the adjusted resource distribution constraint specifies a maximum output to the provider of the given resource irrespective of the actual scope of distribution of the given resource beyond a maximum specified scope of distribution. The system further determines that the actual scope of distribution has reached the maximum specified scope of distribution, and provides the maximum output based on the determination that the actual scope of distribution has reached the maximum specified scope of distribution.

In some implementations, the adjusted resource distribution constraint specifies a variable output to the provider of the given resource based on the actual scope of distribution being between a minimum specified distribution level and a maximum specified distribution level. The system further determines, at a specified time, that the actual scope of distribution is between the minimum specified distribution level and the maximum specified distribution level; and provides a given output to the provider based on the actual scope of distribution and a variable amount.

In some implementations, the baseline resource distribution constraint specifies a baseline unit amount. To adjust the baseline resource distribution constraint, the system determines the variable amount based on the baseline unit amount and one or more adjustment parameters. In some implementations, to determine the variable amount, the system applies a linear function to the baseline unit amount. In some implementations, the system further determines the one or more adjustment parameters based on known resource distribution constraints of a set of resources of the first type and known resource distribution constraints of a set of resources of the second type.

In some implementations, the baseline resource distribution constraint specifies a baseline unit amount. To determine the baseline resource distribution constraint, the system performs for each of two or more feature categories in the first subset, determining a respective category-specific baseline unit amount from the historical distribution data for the second type of resource based on the second type of resource sharing the respective feature category with the given resource, and determining the baseline unit amount as a weighted average of the two or more category-specific baseline unit amounts.

In some implementations, the given resource includes a digital component. In some examples, each of the set of feature categories includes a respective topic.

This specification also provides a system including one or more computers and one or more storage devices storing instructions that, when executed by the one or more computers, cause the one or more computers to perform the method described above.

This specification also provides one or more computer storage media storing instructions that when executed by one or more computers, cause the one or more computers to perform the method described above.

Particular embodiments of the subject matter described in this specification can be implemented so as to realize one or more of the following advantages.

This specification provides techniques for determining a set of distribution constraints for distribution of a given resource (e.g., a user generated video or another digital item), even when there is not a sufficient amount of historical distribution data related to distributing resources of the same type as the given resource. In particular, a computer-implemented system can use the historical distribution data of a second type of resource that differs from the resource type of the given resource to determine a baseline resource constraint, which can then be adjusted based on the differences between the second resource type and the resource type of the given resource to arrive at the set of distribution constraints for distributing the given resource. In a specific example, even without any historical data related to distribution of a particular type of resource, such as user generated videos distributed over a social network using the user's account, the techniques discussed herein can identify a different resource type, such as other types of videos that are distributed within online content provided by various different parties, and use the historical data for the different resource type to determine the set of distribution constraints for the particular type of resource. In this way, the techniques discussed herein avoid the cold start problem that newly introduced types of content face.

In another example, the given resource can include performing a particular computational task (e.g., executing a software, performing a database query, hosting a web service) for multiple client devices provided by a computer server. Distribution constraints, such as available network bandwidth, available CPU capacities, available memory capacities, and/or available I/O capacities, need to be determined for the computer server to operate under a specified set of conditions. When there is not a sufficient amount of historical data for performing the particular computational task (e.g., a software service for a certain industry segment) by the computer server to determine one or more distribution constraints that will achieve the specified set of conditions, the techniques provided by this specification can infer the one or more distribution constraints, for example, by utilizing the distribution data of a computational task that is different from the particular computational task, e.g., a database service for the given industry segment.

In another example, the given resource can be a particular digital content component (e.g., a video, an audio, a digital image, a computer game, a text-based component, or a data item) provided by a content provider. The distribution constraints for providing the digital component can include hardware resources, software resources, data resources, financial payments, and so on. When there is not a sufficient amount of historical data collected from prior distributions of the particular digital component (e.g., a video related to a given topic) to determine the distribution constraint, the techniques provided by this specification can infer the distribution constraint by utilizing the distribution data of a digital component that is different from the particular digital component, e.g., a text-based component related to the given topic).

Using the resource distribution constraint to condition the resource distribution resource helps to reduce (or eliminate) distribution of the resources in situations that are inappropriate, e.g., when the provider of the resource is operating in unsuitable or sub-optimal conditions. This can prevent inappropriate distribution of the resource, which reduces the computational resources required to obtain a given outcome. In addition, in certain applications, using the resource distribution constraint to condition resource distribution can improve the operational conditions of the resource provider, so that the given resource can be distributed with maximum scope and/or efficiency. As such, the described technology improves the efficiency of the computer system operation, which is an improvement to the computer system itself. Hence, operation of the system itself is improved by providing more efficient processes for controlling distribution of the resource.

Furthermore, use of the present technology can help prevent unintended presentations of content, which would otherwise waste server and client device resources, thereby improving the efficiency of the server and client devices. For example, by preventing unintended presentations of content at a client device, many of which are battery operated, the power required to render and display the content is not utilized, thereby extending the battery life of the client device.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, this specification describes systems and techniques for distributing a given resource to multiple client devices. While the focus of the following description centers around the distribution of digital components (e.g., videos, audio, digital images, computer games, text-based items, or data items), the digital components are used solely as illustrative examples to describe the provided techniques. The techniques described herein are applicable to other forms of resource distribution, such as executing software, performing database queries, or hosting web services on a computer server. Therefore, the scope of this specification encompasses the distribution of various types of resources utilizing the techniques outlined herein.

In some situations, the techniques discussed herein can also be used to optimize the utilization of scarce resources. For example, when a resource is scarce, such as cloud computing services or another finite resource available to be allocated, the distribution of that resource may need to be managed to ensure that a certain overall distribution goal is achieved. For example, if the resource is simply allocated on a per-unit basis, the resource may not be consumed during a given time period, thereby leaving unutilized resources at the end of the given time period, which is sub-optimal in many cases. Furthermore, lack of consumption of the resource can discourage making the resource available in certain circumstances, for example, when the resources could simply be reallocated to another use. On the other hand, the resource could be fully consumed well before the end of the given time period, leaving no ability to distribute the resource for the rest of the given time period, which may also lead to a sub-optimal result. To avoid these situations, the techniques discussed herein utilize tiered distribution constraint technique that ensures that there is sufficient incentive for resources to be made available for allocation and distribution, while also ensuring that the full amount of available resources required to be distributed is not exceeded during the given time period.

Figure 1:
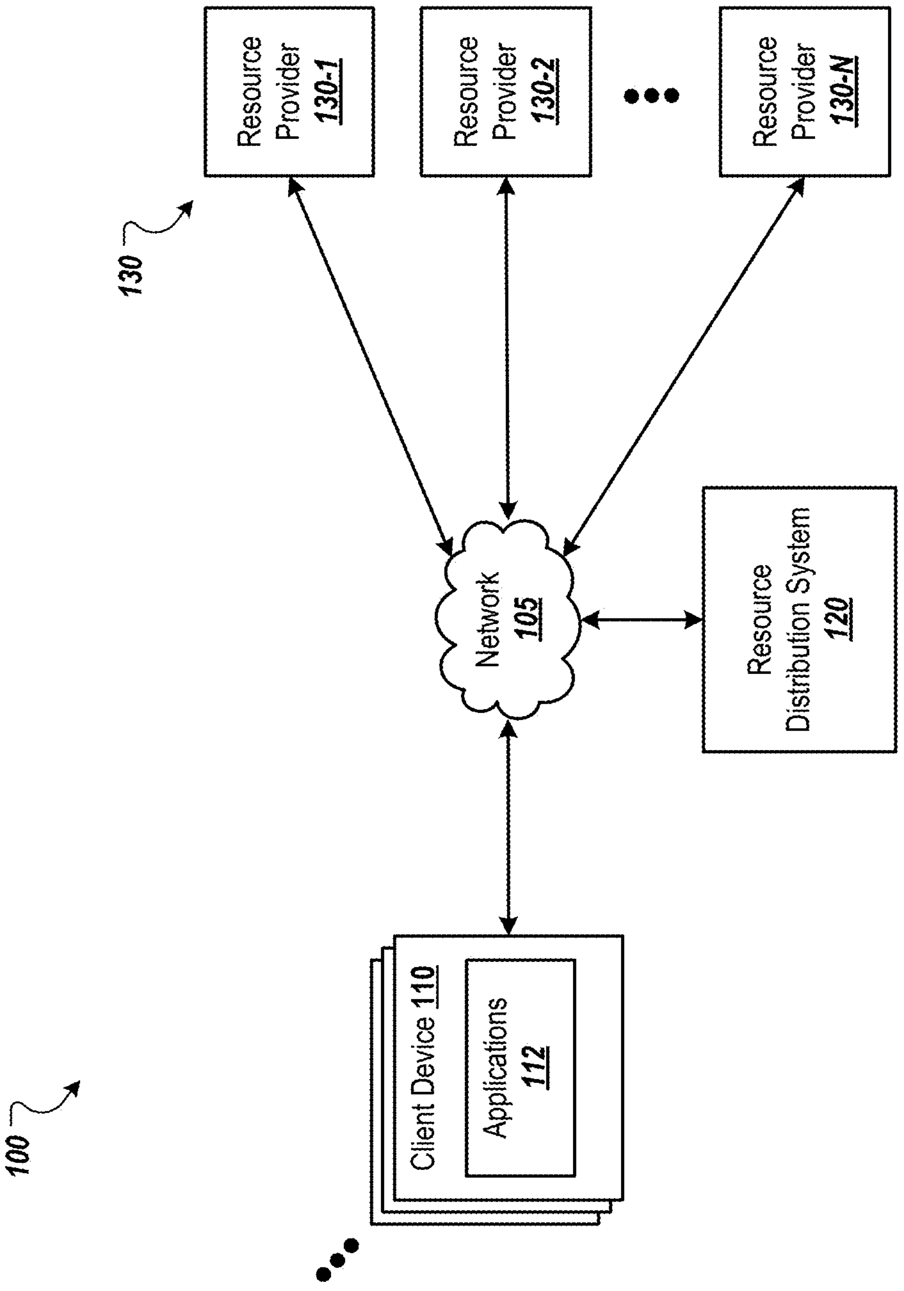
FIG. 1 illustrates an example environment in which a resource distribution system distributes resources to client devices.

FIG. 1 illustrates an example environment 100 in which a resource distribution system 120 distributes resources to client devices 110. The environment 100 includes a data communication network 105, such as a local area network (LAN), a wide area network (WAN), the Internet, a mobile network, or a combination thereof. The data communication network 105 connects client devices 110 to the resource distribution system 120. The data communication network 105 connects the resource distribution system 120 and/or the client devices 110 with one or more resource providers 130, e.g., 130-1, 130-2, and 130-N.

A client device 110 is an electronic device that is capable of communicating over the network 105. Example client devices 110 include personal computers, server computers, mobile communication devices, e.g., smart phones and/or tablet computers, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, a gaming device, or a virtual reality system.

A gaming device is a device that enables a user to engage in gaming applications, for example, in which the user has control over one or more characters, avatars, or other rendered content presented in the gaming application. A gaming device typically includes a computer processor, a memory device, and a controller interface (either physical or visually rendered) that enables user control over content rendered by the gaming application. The gaming device can store and execute the gaming application locally, or execute a gaming application that is at least partly stored and/or served by a cloud server (e.g., online gaming applications). Similarly, the gaming device can interface with a gaming server that executes the gaming application and "streams" the gaming application to the gaming device. The gaming device may be a tablet device, mobile telecommunications device, a computer, or another device that performs other functions beyond executing the gaming application.

A client device 110 can execute applications 112, such as web browsers and/or native applications, to facilitate the sending and receiving of data over the network 105. A native application is an application developed for a particular platform or a particular device (e.g., mobile devices having a particular operating system). Operations described as being performed by the client device 110 can be performed by the application 112 and operations described as being performed by the application 112 can be performed by another component of the client device 110. A client device 110 can include many different types of applications.

The application 112 can present electronic resources, e.g., web pages, application pages, or other application content, to a user of the client device 110. The electronic resources can include digital component slots for presenting digital components with the content of the electronic resources. A digital component slot is an area of an electronic resource (e.g., web page or application page) for displaying a digital component. A digital component slot can also refer to a portion of an audio and/or video stream (which is another example of an electronic resource) for playing a digital component. For the purposes of this document, the electronic resource can refer to a web page, application page, application content presented by a native application, electronic document, audio stream, video stream, gaming interface, or other appropriate type of electronic resource with which a digital component can be presented.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource that includes a digital component slot, the application 112 can generate a digital component request that requests a digital component for presentation in the digital component slot. In some implementations, the digital component slot and/or the resource can include code (e.g., scripts) that cause the application 112 to request a digital component. The application 112 can send the digital component request to the content platform 130.

A digital component request sent by the application 112 can include contextual data. The contextual data can describe the environment in which a selected digital component will be presented. The contextual data can include, for example, a resource locator for a resource (e.g., website or native application) with which the selected digital component will be presented, coarse location information indicating a general location of the client device 110 that sent the digital component request (e.g., the country or state in which the client device 110 is located), a type of the client device 110 (e.g., laptop computer, smartphone, gaming device, etc.), a spoken language setting of the application 112 or client device 110, the number of digital component slots in which digital components will be presented with the resource, the types of digital component slots, and other appropriate contextual information. The resource locator can be in the form of a Universal Resource Locator (URL), a Uniform Resource Identifier (URI), network address, domain name, or other appropriate resource locator.

Some applications 112 can include a video player for streaming or otherwise playing videos requested from the content platform 130 or another video source. When the application 112 sends a digital component request for a digital component to display with a video, e.g., in a break in the video or adjacent to the video player, the application 112 can include, e.g., in the contextual data, data identifying the video. The data identifying the video can include a unique identifier for the video, the title of the video, a resource locator for a resource from which the video is streamed or downloaded, and/or other appropriate information for identifying a video, Each of the resource providers 130 can be implemented by one or more computers in one or more locations, and is configured to create, generate, or otherwise provide resources that are distributed (e.g., by the distribution system 120) to the client devices 110 via the network 105. Examples of the resources provided by the resource providers 130 include the performance of computer tasks (e.g., executing a software, performing a database query, hosting a web service) for the client devices 110. Other examples of the resources provided by the resource providers 130 include digital components (e.g., a video, an audio, a digital image, a computer game, an HTML page, a document, or a data item) that are created by the resource providers 130 and distributed to the client devices 110.

The resource distribution system 120 can be implemented by one or more computers in one or more locations, and is configured to control the distribution of resources provided by the resource providers 130 to the client devices 110. In particular, the resource distribution system 120 can determine a resource distribution constraint that conditions the distribution of a given resource, and distribute the given resource to the client devices 110 based on the resource distribution constraint. For example, for a given resource (e.g., a digital component of a certain type), the resource distribution system 120 can determine conditions that need to be met for distributing the given resource to one or more of the client devices 110.

The resource distribution constraint can be characterized by one or more values for one or more condition parameters. In some implementations, the resource distribution constraint can be characterized by a condition parameter that indicates an output amount that will be provided to the resource provider 130 of the given resource if the given resource is distributed to one or more of the client devices 110. For example, the condition parameter can indicate an amount of hardware resource, an amount of software resource, an amount of data resource, and/or a pecuniary amount that is provided to the resource provider 130 of the given resource if the given resource is distributed to one or more of the client devices 110. In some cases, the output amount that is provided to the resource provider 130 depends on an actual scope of distribution of the given resource. The scope of distribution is characterized by, for example, the total number of distributions of the given resource (e.g., the total number of views of the provided digital component), and/or the total number of client devices 110 the given resource has been distributed to.

In some implementations, the distribution constraint can specify additional distribution criteria that define the situations in which the resource is eligible to be provided to a client device 110. The distribution criteria can be characterized by one or more distribution parameters. For example, the distribution parameters for a particular digital component can include distribution keywords that must be matched, e.g., by terms specified in a request from a client device 110, in order for the digital component to be eligible for display at the client device. In another example, the distribution criteria for a digital component can include location information indicating which geographic locations that digital component is eligible to be presented, user group membership data identifying user groups to which the digital component is eligible to be presented, resource data identifying resources with which the electronic resource is eligible to be presented, and/or other appropriate distribution criteria. The distribution criteria can also include negative criteria, e.g., criteria indicating situations in which the digital component is not eligible (e.g., with particular resources or in particular locations).

Figure 2:
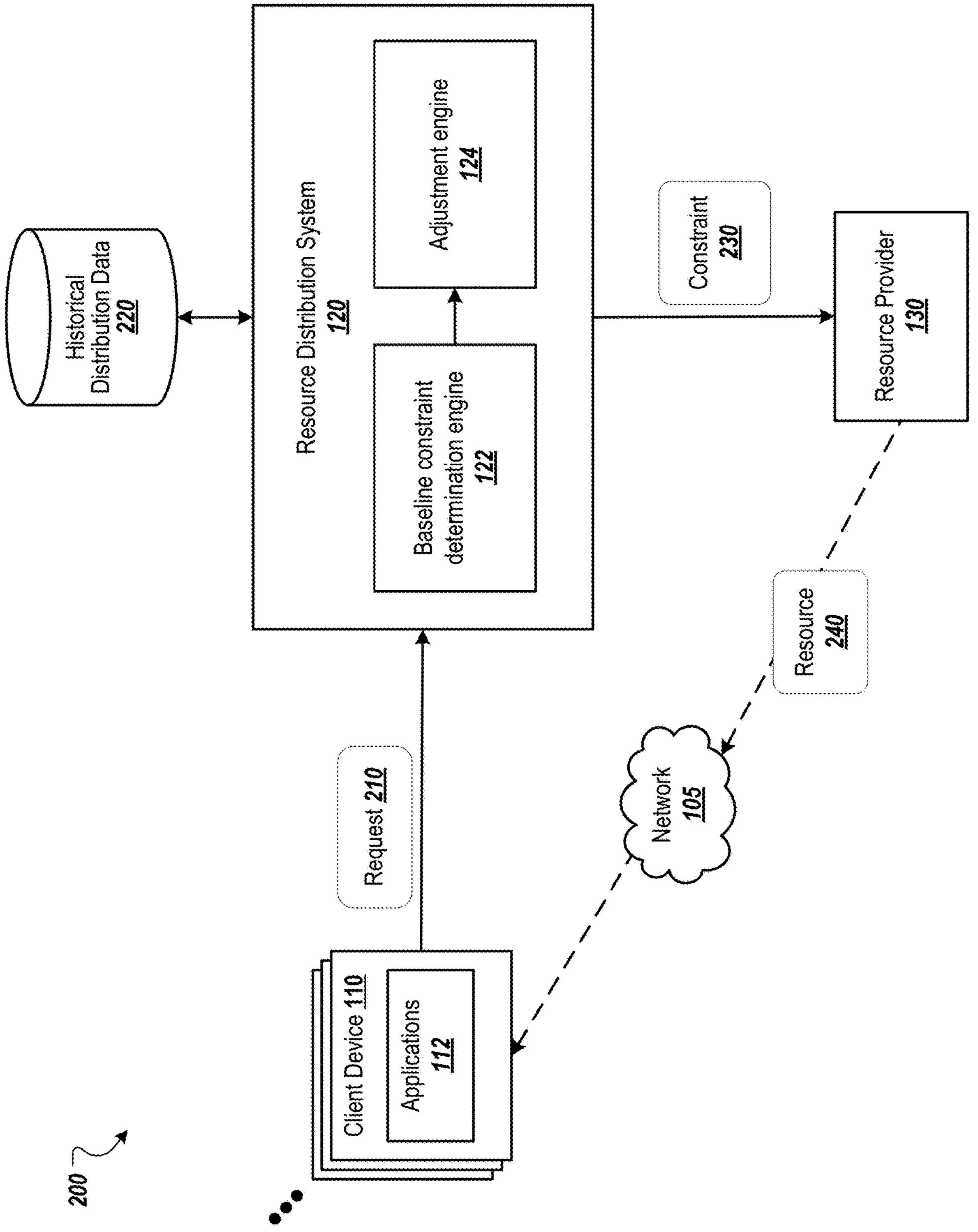
FIG. 2 illustrates another example environment in which a resource distribution system distributes resources to client devices.

FIG. 2 illustrates the data flow and operational details of the resource distribution system 120 operates in an example environment 200.

The resource distribution system 120 receives a first request 210 from a client device 110 for a given resource. The system 120 also receives a second request for a resource distribution constraint that conditions the distribution of the given resource. In some implementations, the second request can be a part of the first request 210 received from the client device 110. In some other implementations, the second request is a request separate from the first request 210. The second request can be received from an entity different from the client device 110, e.g., from the resource provider 130, or from another system.

In some implementations, the first or the second request can include information describing the given resource. The information can specify the resource type and one or more features of the given resource. For example, the given resource can be of a first type and has a first subset of feature categories.

In some implementations, the given resource is a digital component. In one example, the resource type can specify a medium type (e.g., a video, an audio, an image, an E-book, a social media post, a website, an interactive game, etc.) of the given resource. In another example, the resource type can characterize a process for creating the digital component, e.g., whether the digital component is generated using a particular software or process, or whether the digital component is AI-generated. In another example, the resource type can characterize an intent for creating the digital component, e.g., whether the digital component is created for information, entertainment, or for promoting a product. The feature categories of the digital component can specify the content topics of the digital component.

In an illustrative example, the resource type of the given digital component can be "user-generated video", and the feature categories of the given digital component can include topics {"gardening", "landscape design", "organic fertilizers"}.

The resource distribution system 120 can determine the distribution constraint for conditioning the distribution of the given resource based on historical distribution data 220 that specify distribution constraints of resources that have been distributed in the past.

The historical distribution data 220 can include data specifying the past distributions of a set of resources that match the properties of the given resource, e.g., resources that (i) match the resource type (i.e., the first type) of the given resource, and (ii) match at least one feature category of the given resource. The set of resources can further match one or more additional properties of the given resource. The additional properties can include properties such as the attributes of the resource provider and attributes of the client devices (e.g., types of devices, geographic regions of the devices, user attributes of the devices, etc.). If there is a sufficient amount of historical distribution data for resources that match the properties of the given resource, the resource distribution system 120 can use the historical distribution data of the first type of resources to determine the distribution constraint of the given resource in a relatively straightforward manner, e.g., by using linear, polynomial, exponential, or other types of extrapolation techniques.

However, in some cases, there is not a sufficient amount of historical distribution data for resources that match the properties of the given resource. That is, the available data for past distributions of the first type of resources is not sufficient (e.g., there is little to no available data) for accurately determining the distribution constraint of the given resource. The sufficiency of the data can be determined based on one or more factors, including the data coverage (e.g., if the available dataset covers the range of variables of interest), the data quality (e.g., whether the available data is obtained with consistent measurement techniques and a small number of missing values or outliers), data consistency (e.g., if the data is consistent over time or across different sources, or has consistent and stable data patterns), the sample size (e.g., if the data sample size is adequate given the data complexity), the data distribution (e.g., how even the data points are distributed across the range of interests), and/or the risk tolerance (e.g., the acceptable level of risk associated with incorrect extrapolation results).

If the resource distribution system 120 determines that there is not a sufficient amount of historical distribution data for resources of the first type having the first subset of feature categories to generate the requested distribution constraint for the given resource, the resource distribution system 120 is configured to identify historical distribution data for resources that are related to the given resource but do not match the resource type of the given resource. In particular, the resource distribution system 120 is configured to determine that a second type of resource (i) shares a first feature category among the first subset of feature categories with the given resource and (ii) has a sufficient amount of historical distribution data to generate a distribution constraint for the second type of resource. In this case, the resource distribution system 120 is configured to determine the distribution constraint for the given resource using the historical distribution data of the second type of resource.

In the illustrative example described above, the given resource is a digital component having the type of "user-generated video" and feature categories including topics {"gardening", "landscape design", "composting"}. There may not be sufficient historical distribution data for user-generated videos including the above feature categories to determine the distribution constraint for the given resource. However, the resource distribution system 120 may determine that there is sufficient historical distribution data for resources having a second type of "blog post" and at least a feature category of "gardening". The resource distribution system 120 can then use the historical distribution data of the second type of resource to determine the distribution constraint for distributing the given resource.

In another example, assume that there is insufficient (zero or less than a specified amount of) data available for a user generated video having the feature categories {"gardening", "landscape design", "composting"} that is distributed by way of the user's social media account, but that there is sufficient (e.g., at least the specified amount of) data available for various videos having the feature category of "gardening" that are presented with content distributed by various different content providers (e.g., in a digital component slot). In this example, the resource distribution system 120 can then use the historical distribution data of the videos presented with content distributed by the various different content providers to determine the distribution constraint for the user generated video that is distributed by way of the user's social media account, even though the distribution channels of these two different videos are very different.

In particular, the resource distribution system 120 includes a baseline constraint determination engine 122 and an adjustment engine 124. The baseline constraint determination engine 122 is configured to determine a baseline resource distribution constraint using the historical distribution data for the second type of resources based on the second type of resources sharing a first feature category with the given resource. The adjustment engine 124 is configured to adjust the baseline resource distribution constraint based at least on one or more differences between the second type of resource and the first type of resource. The resource distribution system 120 can then send the constraint 230 (that has been adjusted by the adjustment engine 124) to the resource provider 130, and control the distribution of the given resource 240 to the client devices 110 based on whether the constraint 230 is met.

As discussed above, the constraint 240 can specify an output amount (e.g., an amount of hardware resource, an amount of software resource, an amount of data resource, and/or a pecuniary amount) that will be provided to the resource provider 130 of the given resource if the given resource is distributed to one or more of the client devices 110. The constraint 240 can specify a maximum output amount to the provider 130 irrespective of the actual scope of distribution of the given resource 240 beyond a maximum specified scope of distribution, a minimum output amount, and a variable output amount to be provided to the resource provider 130. In some implementations, the constraint 240 specifies a guaranteed minimum output that will be provided to the provider 130 irrespective of an actual scope of distribution of the given resource 240 (e.g., as long as the given resource 240 is distributed at least once to at least one client device), a maximum output to the provider 130 irrespective of the actual scope of distribution of the given resource 240 beyond a maximum specified scope of distribution, and a variable output to the provider of the given resource based on the actual scope of distribution being between a minimum specified distribution level and a maximum specified distribution level.

For the maximum output, the resource distribution system 120 can determine if the actual scope of distribution has reached the maximum specified scope of distribution, and provide the maximum output if it has been determined that the actual scope of distribution has reached the maximum specified scope of distribution. After the maximum output has been reached, the resource distribution system 120 will not provide any further output to the provider 130 even if the given resource is again distributed to one or more client devices.

For the variable output, the resource distribution system 120 can determine, at a specified time, that the actual scope of distribution is between the minimum specified distribution level and the maximum specified distribution level, and provide a given output to the resource provider 130 based on the actual scope of distribution and a variable amount. For example, the resource distribution system 120 can provide additional output to the provider 130 for each distribution of the given resource when the actual scope of distribution is between the minimum specified distribution level and the maximum specified distribution level.

In some implementations, the variable amount can be a parameter specifying an amount of output for each unit scope of distribution (e.g., each actual distribution of the resource 240). That is, the variable output is computed as the variable amount multiplied by the actual scope of distribution. In this case, the baseline resource distribution constraint can specify a baseline unit amount, and the adjustment engine 124 can determine the variable amount by adjusting the baseline unit amount. The baseline constraint determination engine 122 can determine the baseline unit amount, which specifies an amount of output for each unit scope of distribution of the second type of resources, and the adjustment engine 124 can adjust the baseline unit amount for distributing the given resource 240 by taking into account the differences between the second type of resource and the first type of resource.

In some implementations, the given resource 240 can have multiple feature categories, e.g., including a first feature category and a second feature category. The baseline constraint determination engine can determine the baseline resource distribution constraint using historical distribution data for (i) a first set of resources of the second type and having the first feature category and (ii) a second set of resources of the second type and having the second feature category. In particular, for each of two or more feature categories of the given resource, the baseline constraint determination engine 122 can determine a respective category-specific baseline unit amount from the historical distribution data for the second type of resource sharing the respective feature category with the given resource. The category-specific baseline unit amount can be determined by aggregating (e.g., by performing averaging of) the data specifying the distribution constraint for the corresponding set of resources of the second type. The baseline constraint determination engine 122 can then determine the baseline unit amount as a weighted average of the two or more category-specific baseline unit amounts.

In the illustrative example described above, the given resource is a digital component having the type of "user-generated video" and feature categories including topics {"gardening", "landscape design", "composting"}. Historical distribution data is available for resources having a second type of "blog post", including a first set of blog posts having the feature category "gardening", a second set of blog posts having the feature category "landscape design", and a third set of blog posts having the feature category "composting". The baseline constraint determination engine 122 can respectively determine a category-specific baseline unit amount for each set of blog posts, e.g., a baseline unit amount of 80 for "gardening", a baseline unit amount of 100 for "landscape design", and a baseline unit amount of 30 for "composting". The baseline constraint determination engine 122 can further determine a respective weight coefficient for each of the feature categories, e.g., based on the relevancy or importance of the respective feature category with regard to the given resource. For example, the given resource can be determined as 60% relevant to "gardening", 30% relevant to "landscape design", and 10% relevant to "composting". Thus, the baseline constraint determination engine 122 can compute the baseline unit amount as a weighted average of $80\times0.6+100\times0.3+30\times0.1=81$.

Once the baseline unit amount is determined, the adjustment engine 124 can determine the variable amount based on the baseline unit amount and one or more adjustment parameters. In one particular example, to determine the variable amount y, the adjustment engine 124 can apply a linear function $\phi$ to the baseline unit amount x based on a scaling factor $\alpha$ and optionally, an intercept amount $\beta$, i.e., $y=\phi(x)=\alpha x+\beta$.

In general, the function $\phi$ describing the relationship between variable amount y and the baseline unit amount x is not limited to a linear function, and an appropriate function type can be selected according to the specific application and/or the properties of the differences between the first and the second resource types.

In some implementations, the resource distribution system 120 or another system can determine the adjustment parameters based on known resource distribution constraints of a set of resources of the first type and known resource distribution constraints for a set of resources of the second type. For example, the historical distribution data 220 can include (i) first data specifying the past distribution constraints of a first set of resources of the first type and (ii) second data specifying the past distribution constraints of a second set of resources of the second type. The resource distribution system 120 can use any appropriate optimization techniques to determine the adjustment parameters of the function $\phi$ describing the relationship between the variable amount y and the baseline unit amount x. Examples of optimization techniques include gradient descent, Newton's method, Levenberg-Marquardt method, Bayesian optimization, search algorithms, stochastic gradient descent, adaptive moment estimation (Adam), and so on.

Figure 3:
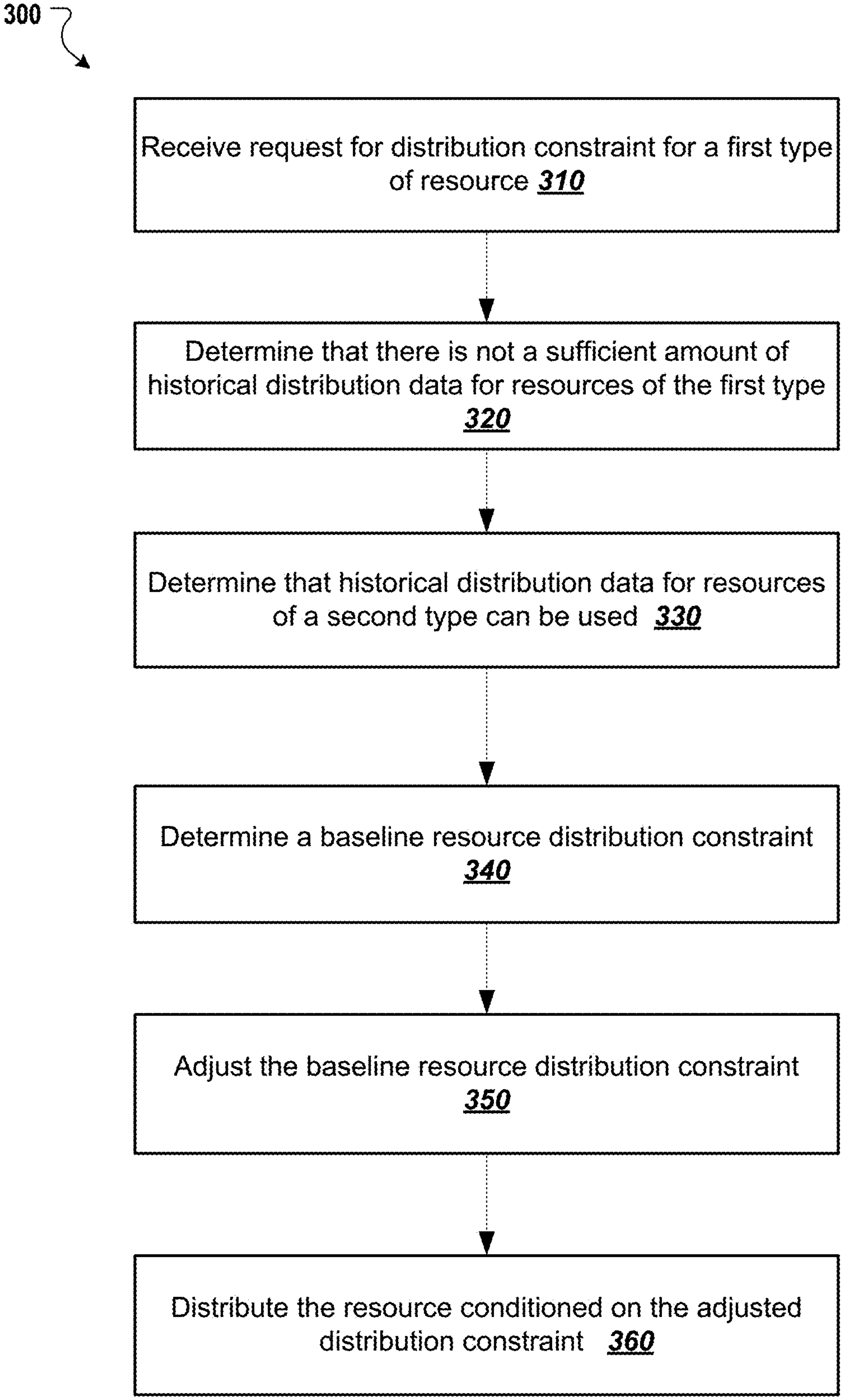
FIG. 3 is a flow diagram of an example process for distributing a resource to client devices.

FIG. 3 is a flow diagram of an example process 300 for creating a set of distribution constraints that regulate distribution of a given resource to client devices. Operations of the process 300 can be performed by a system of one or more computers located in one or more locations, such as a server, e.g., the resource distribution system 120 described with references to FIG. 1 and FIG. 2, appropriately programmed in accordance with this specification. Operations of the process 300 can also be implemented as instructions stored on one or more computer-readable media, which may be non-transitory, and execution of the instructions by one or more data processing apparatus can cause the one or more data processing apparatus to perform the operations of the process 300. For convenience and without loss of generality, the process 300 will be described as being performed by a data processing apparatus, e.g., a computer system.

At 310, the system receives a request for a resource distribution constraint that conditions the distribution of a given resource of a first type having a first subset of feature categories among a set of feature categories. In some implementations, the given resource can be a digital component. Each feature category can be a topic of the digital component. In some implementations, the request for the resource distribution constraint can be received by a creator/source of the given resource, or from a third-party seeking to request creation/providing of the given resource for distribution. The request can be received, for example, through a user interface in which details regarding the given resource can be input, and the resource distribution constraint can be presented.

The resource distribution constraint can be characterized by one or more values for one or more condition parameters. In some implementations, the resource distribution constraint can be characterized by a condition parameter that indicates an output amount that will be provided to the resource provider of the given resource if the given resource is distributed to one or more of the client devices.

At 320, the system determines that there is not a sufficient amount of historical distribution data for resources of the first type having the first subset of feature categories to generate the requested distribution constraint. That is, the system determines that available data for past distributions of the first type of resources is not sufficient (e.g., there is little to no available data) for accurately determining the distribution constraint of the given resource. As discussed above, the sufficiency of the data can be determined based on one or more factors, such as the data coverage, the data quality, data consistency, the sample size, the data distribution, and/or the risk tolerance.

At 330, the system determines that a second type of resource (i) shares a first feature category among the first subset of feature categories with the given resource, (ii) has a second feature category that is not among the first subset of feature categories, and (iii) has a sufficient amount of historical distribution data to generate an distribution constraint for the second type of resource.

At 340, the system determines a baseline resource distribution constraint using the historical distribution data for the second type of resource based on the second type of resource sharing the first feature category with the given resource.

In some implementations, the baseline resource distribution constraint specifies a baseline unit amount. The system can determine the baseline unit amount as a weighted average of two or more category-specific baseline unit amounts that are determined from the historical distribution data for resources of the second type. For example, the first subset of feature categories can in include a first feature category and a second feature category. The system can determine the baseline resource distribution constraint using historical distribution data for (i) a first set of resources of the second type and having a first feature category in the and (ii) a second set of resources of the second type and having the second feature category. In particular, for each of two or more feature categories of the given resource, the system can determine a respective category-specific baseline unit amount from the historical distribution data for the second type of resource sharing the respective feature category with the given resource. The category-specific baseline unit amount can be determined by aggregating (e.g., by performing averaging of) the data specifying the distribution constraint for the corresponding set of resources of the second type. The system can then determine the baseline unit amount as a weighted average of the two or more category-specific baseline unit amounts.

At 350, the system adjusts the baseline resource distribution constraint based on (i) one or more differences between the second type of resource and the first type of resource, and (ii) predicted scope of distribution of the given resource to an adjusted resource distribution constraint.

The adjusted resource distribution constraint can specify a guaranteed minimum output to a provider of the given resource irrespective of an actual scope of distribution of the given resource.

The adjusted resource distribution constraint can specify a maximum output to the provider of the given resource irrespective of the actual scope of distribution of the given resource beyond a maximum specified scope of distribution. The system can determine that the actual scope of distribution has reached the maximum specified scope of distribution, and in response, provide the maximum output.

The adjusted resource distribution constraint can specify a variable output to the provider of the given resource based on the actual scope of distribution being between a minimum specified distribution level and a maximum specified distribution level. The system can determine, at a specified time, that the actual scope of distribution is between the minimum specified distribution level and the maximum specified distribution level, and in response, provide a given output to the provider based on the actual scope of the distribution and a variable amount. The system can determine the variable amount based on (i) a baseline unit amount specified by the baseline resource distribution constraint and (ii) one or more adjustment parameters. For example, the system can determine the variable amount by applying a linear function to the baseline unit amount. The system can determine the adjustment parameters based on known resource distribution constraints of a set of resources of the first type and known resource distribution constraints of a set of resources of the second type.

At 360, the system distributes the given resource to multiple different client devices according to the adjusted resource distribution constraint. For example, to initiate distribution of the resource, the system can allocate a guaranteed minimum output to the source of the given resource irrespective of the actual scope of distribution of the given resource. In other words, the guaranteed minimum output can be provided to the source of the given resource to ensure that the creator/source of the given resource receives a minimum level of output (e.g., a minimum level of a constrained resource) in exchange for making the given resource available for consumption by others irrespective of whether others actually consume the given resource.

When the actual scope of distribution reaches a first threshold distribution level (e.g., a minimum distribution level specified by the adjusted resource distribution constraint), the system can begin to provide additional output to the creator/source of the given resource on a per-unit-distribution basis until the actual distribution reaches a maximum specified distribution level. For example, while the actual scope of distribution is between the minimum specified distribution level and the maximum specified distribution level specified by the adjusted resource distribution constraint, the system can provide a given per-unit level of output for each unit of distribution (e.g., each distribution or each set of X distributions).

Once the actual scope of distributions (e.g., number of distributions) meets the maximum specified distribution level, the given resource can continue to be distributed, but the system will no longer provide additional output to the creator/source of the given resource. In some implementations, the determination of whether the maximum specified distribution level has been met can be time limited, such that after a certain period of time, the system can again begin providing additional output to the creator/source of the given resource. For example, at the end of a given time period, the system can start the distribution over from the beginning (e.g., with the guaranteed minimum output), as discussed above, they system can revert to the per-unit level of output for each unit of distribution, or the system can invoke a different strategy for providing output to the creator/source of the given resource.

Figure 4:
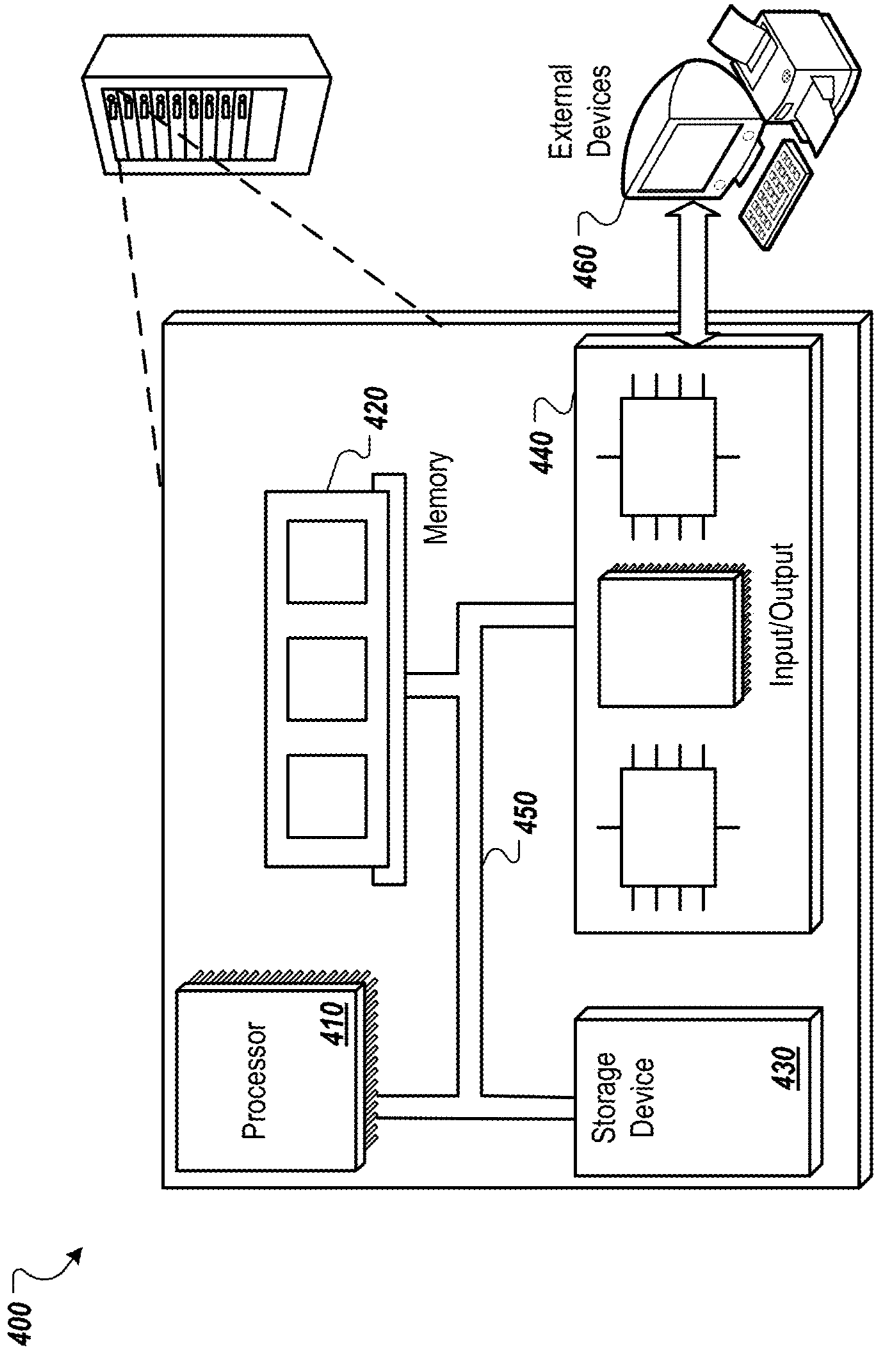
FIG. 4 is a block diagram of an example computer system.

FIG. 4 is a block diagram of an example computer system 400 that can be used to perform the operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large-capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., an 802.11 card. In another implementation, the input/output device can include driver devices configured to receive input data and send output data to external devices 460, e.g., keyboard, printer, and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for resource distribution, the method comprising:

receiving, by one or more computing devices, a request for a resource distribution constraint that conditions distribution of a given resource of a first type having a first subset of feature categories among a set of feature categories;

determining, by the one or more computing devices, that there is not a sufficient amount of historical distribution data for resources of the first type having the first subset of feature categories to generate the requested distribution constraint;

determining, by the one or more computing devices, that a second type of resource (i) shares a first feature category among the first subset of feature categories with the given resource, (ii) has a second feature category that is not among the first subset of feature categories, and (iii) has a sufficient amount of historical distribution data to generate an distribution constraint for the second type of resource;

determining, by the one or more computing devices, a baseline resource distribution constraint using the historical distribution data for the second type of resource based on the second type of resource sharing the first feature category with the given resource;

adjusting, by the one or more computing devices, the baseline resource distribution constraint based at least on (i) one or more differences between the second type of resource and the first type of resource, and (ii) predicted scope of distribution of the given resource to an adjusted resource distribution constraint;

distributing, by the one or more computing devices, the given resource to multiple different client devices according to the adjusted resource distribution constraint; and causing, by the one or more computing devices, the multiple different client devices to execute computational tasks using the given resource distributed according to the adjusted resource distribution constraint.

2. The method of claim 1, wherein the adjusted resource distribution constraint specifies a guaranteed minimum output to a provider of the given resource irrespective of an actual scope of distribution of the given resource.

3. The method of claim 1, wherein the adjusted resource distribution constraint specifies a maximum output to the provider of the given resource irrespective of the actual scope of distribution of the given resource beyond a maximum specified scope of distribution, the method further comprising:

determining that the actual scope of distribution has reached the maximum specified scope of distribution; and providing the maximum output based on the determination that the actual scope of distribution has reached the maximum specified scope of distribution.

4. The method of claim 1, wherein the adjusted resource distribution constraint specifies a variable output to the provider of the given resource based on the actual scope of distribution being between a minimum specified distribution level and a maximum specified distribution level, the method further comprising:

determining, at a specified time, that the actual scope of distribution is between the minimum specified distribution level and the maximum specified distribution level; and providing a given output to the provider based on the actual scope of distribution and a variable amount.

5. The method of claim 4, wherein the baseline resource distribution constraint specifies a baseline unit amount; and adjusting the baseline resource distribution constraint comprises:

determining the variable amount based on the baseline unit amount and one or more adjustment parameters.

6. The method of claim 5, wherein determining the variable amount comprises applying a linear function to the baseline unit amount.

7. The method of claim 5, further comprising:

determining the one or more adjustment parameters based on known resource distribution constraints of a set of resources of the first type and known resource distribution constraints of a set of resources of the second type.

8. The method of claim 1, wherein the baseline resource distribution constraint specifies a baseline unit amount; and determining the baseline resource distribution constraint comprises:

for each of two or more feature categories in the first subset, determining a respective category-specific baseline unit amount from the historical distribution data for the second type of resource based on the second type of resource sharing the respective feature category with the given resource; and determining the baseline unit amount as a weighted average of the two or more category-specific baseline unit amounts.

9. The method of claim 1, wherein:

the given resource comprises a digital component.

10. The method of claim 9, wherein each of the set of feature categories comprises a respective topic.

11. A system comprising:

one or more computers; and one or more storage devices storing instructions that when executed by the one or more computers, cause the one or more computers to perform the operations comprising:

receiving, by one or more computing devices, a request for a resource distribution constraint that conditions distribution of a given resource of a first type having a first subset of feature categories among a set of feature categories;

determining, by the one or more computing devices, that there is not a sufficient amount of historical distribution data for resources of the first type having the first subset of feature categories to generate the requested distribution constraint;

determining, by the one or more computing devices, that a second type of resource (i) shares a first feature category among the first subset of feature categories with the given resource, (ii) has a second feature category that is not among the first subset of feature categories, and (iii) has a sufficient amount of historical distribution data to generate an distribution constraint for the second type of resource;

determining, by the one or more computing devices, a baseline resource distribution constraint using the historical distribution data for the second type of resource based on the second type of resource sharing the first feature category with the given resource;

adjusting, by the one or more computing devices, the baseline resource distribution constraint based at least on (i) one or more differences between the second type of resource and the first type of resource, and (ii) predicted scope of distribution of the given resource to an adjusted resource distribution constraint;

distributing, by the one or more computing devices, the given resource to multiple different client devices according to the adjusted resource distribution constraint; and causing, by the one or more computing devices, the multiple different client devices to execute computational tasks using the given resource distributed according to the adjusted resource distribution constraint.

12. The system of claim 11, wherein the adjusted resource distribution constraint specifies a guaranteed minimum output to a provider of the given resource irrespective of an actual scope of distribution of the given resource.

13. The system of claim 11, wherein the adjusted resource distribution constraint specifies a maximum output to the provider of the given resource irrespective of the actual scope of distribution of the given resource beyond a maximum specified scope of distribution, the operations further comprising:

determining that the actual scope of distribution has reached the maximum specified scope of distribution; and providing the maximum output based on the determination that the actual scope of distribution has reached the maximum specified scope of distribution.

14. The system of claim 11, wherein the adjusted resource distribution constraint specifies a variable output to the provider of the given resource based on the actual scope of distribution being between a minimum specified distribution level and a maximum specified distribution level, the operations further comprising:

determining, at a specified time, that the actual scope of distribution is between the minimum specified distribution level and the maximum specified distribution level; and providing a given output to the provider based on the actual scope of distribution and a variable amount.

15. The system of claim 14, wherein the baseline resource distribution constraint specifies a baseline unit amount; and adjusting the baseline resource distribution constraint comprises:

determining the variable amount based on the baseline unit amount and one or more adjustment parameters.

16. The system of claim 14, wherein determining the variable amount comprises applying a linear function to the baseline unit amount.

17. One or more computer storage media storing instructions that, when executed by one or more computers, cause the one or more computers to perform the operations comprising:

receiving, by one or more computing devices, a request for a resource distribution constraint that conditions distribution of a given resource of a first type having a first subset of feature categories among a set of feature categories;

determining, by the one or more computing devices, that there is not a sufficient amount of historical distribution data for resources of the first type having the first subset of feature categories to generate the requested distribution constraint;

determining, by the one or more computing devices, that a second type of resource (i) shares a first feature category among the first subset of feature categories with the given resource, (ii) has a second feature category that is not among the first subset of feature categories, and (iii) has a sufficient amount of historical distribution data to generate an distribution constraint for the second type of resource;

determining, by the one or more computing devices, a baseline resource distribution constraint using the historical distribution data for the second type of resource based on the second type of resource sharing the first feature category with the given resource;

adjusting, by the one or more computing devices, the baseline resource distribution constraint based at least on (i) one or more differences between the second type of resource and the first type of resource, and (ii) predicted scope of distribution of the given resource to an adjusted resource distribution constraint;

distributing, by the one or more computing devices, the given resource to multiple different client devices according to the adjusted resource distribution constraint; and causing, by the one or more computing devices, the multiple different client devices to execute computational tasks using the given resource distributed according to the adjusted resource distribution constraint.

18. The one or more computer storage media of claim 17, wherein the adjusted resource distribution constraint specifies a guaranteed minimum output to a provider of the given resource irrespective of an actual scope of distribution of the given resource.

19. The one or more computer storage media of claim 17, wherein the adjusted resource distribution constraint specifies a maximum output to the provider of the given resource irrespective of the actual scope of distribution of the given resource beyond a maximum specified scope of distribution, the operations further comprising:

determining that the actual scope of distribution has reached the maximum specified scope of distribution; and providing the maximum output based on the determination that the actual scope of distribution has reached the maximum specified scope of distribution.

20. The one or more computer storage media of claim 17, wherein the adjusted resource distribution constraint specifies a variable output to the provider of the given resource based on the actual scope of distribution being between a minimum specified distribution level and a maximum specified distribution level, the operations further comprising:

determining, at a specified time, that the actual scope of distribution is between the minimum specified distribution level and the maximum specified distribution level; and providing a given output to the provider based on the actual scope of distribution and a variable amount.

* * * * *